UNITED STATES PATENT OFFICE.

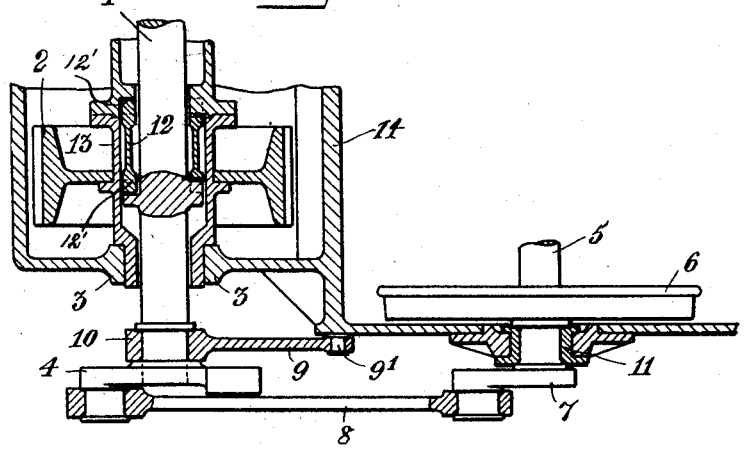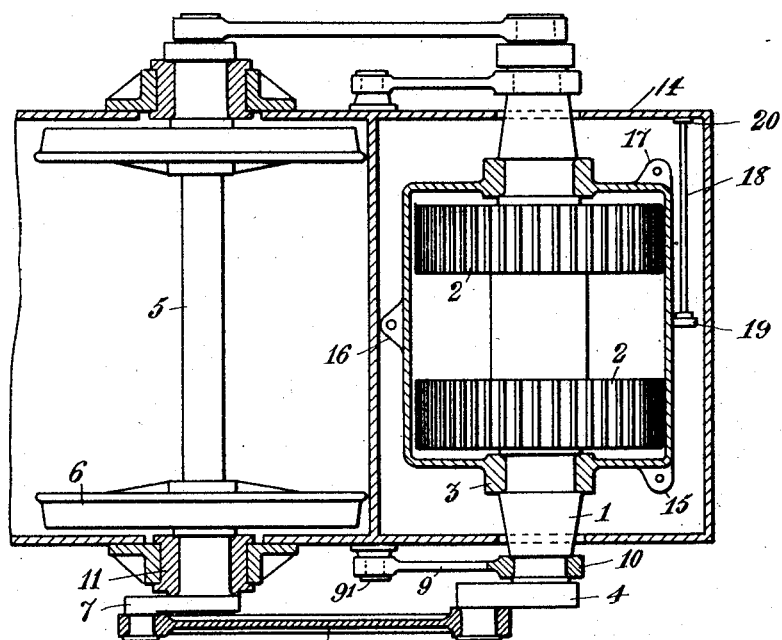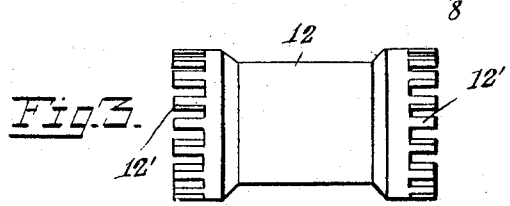

FREDRIK LJUNGSTRÖM, OF BREVIK, ISIDOR BROBERG, OF SKÄRSÄTRA, AND ERIK OTTO ERIKSSON, OF BREVIK, SWEDEN, ASSIGNORS TO AKTIEBOLAGET LJUNGSTROMS ANGTURBIN, OF STOCKHOLM, SWEDEN, A CORPORATION.

LOCOMOTIVE AND SIMILAR VEHICLE.

1,365,256.      Specification of Letters Patent.      Patented Jan. 11, 1921.

Application filed April 1, 1919. Serial No. 286,797.

*To all whom it may concern:*

Be it known that we, FREDRIK LJUNGSTRÖM, ISIDOR BROBERG, and ERIK OTTO ERIKSSON, subjects of the King of Sweden, residing, respectively, at Brevik, Lidingon, Sweden; Tallhyddan, Skärsätra, Lidingon, Sweden, and Ormbunken, Brevik, Lidingon, Sweden, have invented certain new and useful Improvements in Locomotives and Similar Vehicles, of which the following is a specification.

The present invention relates to an arrangement in locomotives and similar vehicles of the class in which two bearings are provided for each crank of one or more of the crank shafts connected with the driving wheels or the driving mechanism, one of the bearings taking up the pressure of the driving mechanism and the other bearing that of the crank.

The invention is principally characterized by this that the bearing taking up the pressure of the crank is connected with the framework of the vehicle by one or more supporting links.

The invention, furthermore, comprises an arrangement in vehicles of the type in question wherein the whole framework containing the driving mechanism is slidably mounted and supported by the crank shaft of the driving mechanism.

By these arrangements above all, a simple and solid construction is obtained.

The invention is clearly illustrated in the accompanying drawings, in which—Figure 1 is a top plan view of one form of the invention, partly in section, Fig. 2 is a similar view of another form of the invention, and Fig. 3 is an elevation of the detail of the resilient bush.

In Fig. 1, 1 designates the crank shaft of the spur gearing driven by the pinion 2. This shaft is journaled directly or indirectly in the bearing 10, and ends in the crank 4 transmitting its power to the wheel axle 5 by means of the connecting rod 8 and the crank 7. This shaft 5, on which the driving wheel 6 is mounted, is journaled in a bearing 11 which in the present construction is rigidly attached to the frame.

The bearing 10 is attached to the framework in any suitable manner, for example by means of the link 9, which is pivotally mounted on the pin 9¹.

The toothed wheel 2 is provided with a separate bearing 3, in which the bushing 13 carrying the toothed wheel is resting. Power is transmitted from the bushing 13 to the axle 1 through the medium of the resilient bush 12 provided with teeth 12' in its ends, the said teeth meshing with corresponding teeth in the bushing 13 and the shaft. This bushing 13 is only resilient in a small degree in the turning direction.

It is evident that in operation the connecting rod 8 is constantly subjected to pressure and tension alternatively, whereby the bearing 10 is subjected to varying pressure, substantially acting in opposite horizontal directions. If the toothed wheel 2 were fixed to the shaft 1, the clearance existent in the bearing 10 would cause an incessant motion of the wheel 2 taking place to and fro, which in turn would give rise to uneven tooth pressures and to thrust and shocks in the gearing, an incorrect contact between the teeth and unnecessary friction in the gearing being the inevitable result of the said disturbances. However, the toothed wheel 2 being journaled in its separate bearing 3 and movably connected with the crank shaft, the movements of the latter will not be imparted to the toothed wheel, all of the said disadvantages being thus effectively overcome.

In the embodiment shown in Fig. 2 the whole framework in which the spur gearing is housed, is movable in a horizontal direction. If forces be produced tending to bend the shaft 1, the latter will move the whole gearing as far as the clearance of the bearing 10 permits, so that the toothed wheels and pinions meshing with each other will retain their relative positions. The bearing 10 is movably connected with the framework of the vehicle by means of the link 9.

14 denotes the framework in which the gearing is mounted, the same being fitted at 15, 16 and 17 in such a manner as to allow of a horizontal movement of the frame. The connecting rod 18 only permits the framework to slide so that the joint 19 is moving through a circular arc struck with 20 as a center. The frame 14 can move since the bolts are inserted so as to have play in the holes at the points or portions at 15, 16 and 17, or else they may pass with play through holes in the bottom plate of the framework of the locomotive upon which the frame 14 rests. Of course, the nuts of said bolts must not be screwed fully down, for the frame 14 must be screwed to said bottom plate in such manner as to enable it to slide horizontally a slight extent without having vertical movement.

If desired, the supporting links 9 may be constructed so as to support the springs of the vehicle.

What we claim as new and desire to secure by Letters Patent of the United States is—

In locomotives and similar vehicles of that type in which two bearings are provided for each crank of one or more of the crank shafts connected with the driving wheels or the driving mechanism, one of the bearings taking up the pressure of the driving mechanism and the other bearing that of the crank, supporting links for connecting the bearing taking up the pressure of the crank with the framework of the vehicle.

In witness whereof we have hereunto set our hands in the presence of two witnesses.

FREDRIK LJUNGSTRÖM.
ISIDOR BROBERG.
ERIK OTTO ERIKSSON.

Witnesses:
P. H. BERGROTH,
GRETA PRISH.